*INVENTOR.*
PAUL D. WURZBURGER

ATTORNEYS

Nov. 2, 1954  P. D. WURZBURGER  2,693,377
BITING RING PIPE COUPLING WITH HELICAL CUTTING EDGE
Filed Jan. 23, 1953  2 Sheets-Sheet 2

INVENTOR.
PAUL D. WURZBURGER

ATTORNEYS

United States Patent Office 2,693,377
Patented Nov. 2, 1954

2,693,377

BITING RING PIPE COUPLING WITH HELICAL CUTTING EDGE

Paul D. Wurzburger, Cleveland Heights, Ohio

Application January 23, 1953, Serial No. 332,955

2 Claims. (Cl. 285—122)

This invention relates to improvements in the art of coupling and more particularly to tube or pipe couplings and fittings and the coupling elements thereof, and in certain aspects comprises an improvement upon my prior inventions, certain of which are disclosed in U. S. Patents Nos. 2,414,184, 2,417,536, 2,474,178 and my co-pending application Serial No. 160,347, filed May 5, 1950.

It is among the objects of my invention to improve upon my own and other prior types of couplings and joints particularly as to fluid sealing and mechanical gripping virtues and facilities and, in addition, to provide the facility of a "close" coupling whereby the tube, piece or pipe to be coupled can be joined to or disconnected from the body or instrumentality with which it is connected or associated without substantial longitudinal motion or displacement; to provide a novel sealing and gripping element to seal and grip the tube to be coupled more effectively and without, or with less hazard, of constricting thin-walled tube undesirably or cutting into the wall of the tube more deeply than is necessary or desirable; to provide a coupling which during the operation of making the joint will reflect a "feel" to the operator that the joint has been completed as by a marked increase in wrench torque; to provide a coupling that does not necessarily require the provision of a flared mouth or conical camming surface interiorly of the body member; to provide a coupling element useful in association with standard or flanged valve bodies and other instrumentalities without specially machining the same; to provide a coupling that is highly resistant to failure or deterioration from the deleterious influence of vibration; to provide a coupling having a cutting edge adapted to turn up a ridge or helical ridge of appreciable size from the wall of the tube or piece to be coupled wherewith to grip the same positively and securely, but also to restrict the depth of the cut and the size of the ridge and at the same time to grip and confine the ridge and to grip the tube adjacent the ridge and at a spaced distance from the cutting edge whereby to enhance the grip upon the tube and more firmly secure the tube mechanically and effect a complete fluid seal and withal to limit more effectively the constriction of the tube incident to making the sealed joint.

Another object is to provide a very long cutting edge in a tube gripping element; the edge having a length several times the circumference of the bore of the element. A collateral object is to effect a mechanical cut and grip between the cutting element and the tube by cutting a long shallow groove and turning up a long relatively small ridge; both the groove and ridge being several times the length of the circumference of the bore of the cutting element so that a maximum mechanical grip may be effected between the coupling element and the tube with, however, a minimum depth of cut into and constriction of the wall of the tube. A more specific object is to provide a long continuous helical cutting edge in the bore of the coupling element of the tube coupling between the turns of which a helical ridge of great length and appreciable height and depth may be turned up from the wall of the tube and in turn gripped, squeezed and compressed between the convolutions of the edge and thread not only in a strong mechanical bond but also in fluid tight relationship therewith.

Other objects include the provision of a gripping and sealing element within which actions and motions may be induced to effect a desirable apportionment of tube surface cutting, gripping, sealing and vibration resistant functions. Another object is to provide a sealing and tube gripping element at least part of which may take a relatively fixed position with relation to the tube or pipe with which it is to be associated in the first instance and may by displacement and deformation of other parts of the element be worked into firm mechanical gripping and fluid sealing relation to the tube and for permanent attachment thereto for repeated connections and disconnections.

Another object is to provide a self-contained coupling element which within itself under the influence of longitudinally acting compressive forces converts and distributes those forces into gripping, cutting and sealing forces and motions to embrace the tube to be coupled and to substantially integrate the same in relation thereto. A further object is to provide a device which while having a principal utility as the coupling element for a tube coupling may also have additional utility not merely with tubes and coupling elements but also with other instrumentalities such as cylindrical rods, shafts, valve stems and the like upon which it may be desirable to substantially "integrate" external peripheral flanges or flanged projections for coaction with other instrumentalities, such as valve bonnets or glands, which may be related to it or them in more or less the same way that the familiar nut and body elements of the tube couplings are related to the coupled tubes, but not necessarily for the same purposes.

Other objects include the provision of means of accomplishment of the foregoing objects that are economical of manufacturing costs and facile, enduring and advantageous in use.

Other objects and advantages will more fully and at large appear from the following description of preferred and modified forms of my invention, reference being had to the accompanying drawings in which.

Figures 1, 2, 3, 4:
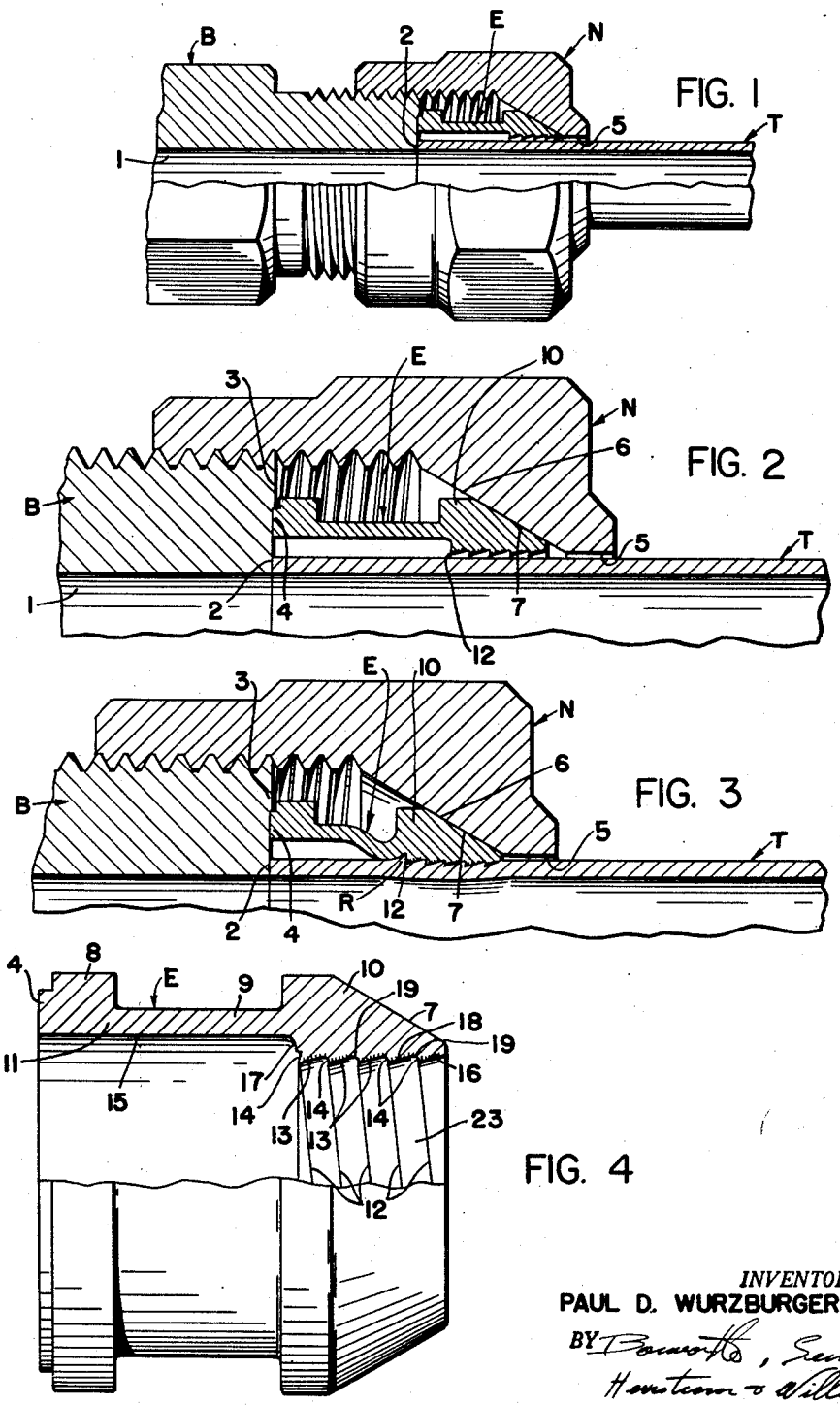
Figure 1 is an elevation partly in longitudinal section of an exemplary prefered form of my invention with the parts in assembled relation but prior to the working, coupling and joining thereof.
Figure 2 is an enlarged fragmentary longitudinal section corresponding to Figure 1.
Figure 3 is a view corresponding to Figure 2 with, however, the parts in coupled and joined relation.
Figure 4 is an elevation partly in a longitudinal section of the coupling element of the form of my invention shown in Figures 1, 2 and 3.

Referring now to the form of my invention shown in Figures 1 to 4 inclusive, there is shown an externally threaded body B to the rearward end of which the tube T is to be coupled and joined by the coaction of the internally threaded nut N between which and the body the coupling element E is worked into tube gripping and sealing relation and into sealing relation with the rearward end of the body. The body B has a bore 1 coextensive with the bore of the tube T and of corresponding inside diameter. The rearward face 2 of the body may, to take advantage of my invention, be substantially flat and planar and lie normal to the axis of the bore of the body and thereby facilitate a "close" coupling. In the form of my invention shown in Figures 1 to 3 inclusive, I prefer that the rearward face 2 of the body have a small annular inwardly facing step or shoulder 3 which may be quite shallow, i. e. of the order of about five to ten thousandths of an inch depth; the step or shoulder 3 being so shallow as to not substantially impair the "closeness" of the coupling while, however, serving to receive the complementary step or shoulder 4 formed on the forward end of the coupling element E, see Figure 4, and center and locate the coupling element coaxially of the bore of the body and tend to resist radial expansion of the forward end of the coupling element E while the coupling element is being worked and after the joint has been made and the parts are subjected to the rigors of service. The rearward face 2 of the body serves as a longitudinal or axial abutment for the forward end of the tube T restraining it against axial movement toward the body and also serves as an abutment for the forward end of the coupling element E holding the forward end of the element against forward axial movement.

The nut N has a bore 5 coaxial with the axis of the bore of the body and coaxial of the tube and closely and freely encompassing the tube, and for particular coaction in my invention the nut has a forwardly facing inclined, preferably substantially conical female seat or camming shoulder 6 engageable with the complementarily formed male shoulder 7 on the outer and rearward end of the coupling element E. The nut N and body B are otherwise shown in their conventional forms and I shall use the terms nut and body to comprehend equivalent instrumentalities such as a flanged body and a flange ring specifically shown in my co-pending application, such a flanged body having, however, a rearward, preferably stepped, face corresponding to the face 2 and the flange ring having a camming shoulder corresponding to the shoulder 6, both for coaction with the element E and tube T as suggested above and more fully described below.

The coupling element E comprises a rearwardly disposed annular relatively thick ring part 10 having the outward and rearward inclined, preferably substantially conical surface 7 mentioned above, and comprises a forwardly disposed relatively thin walled tubular or sleeve part 11; the ring part engaging the nut, and the forward end of the sleeve part engaging the body. The ring and sleeve parts are preferably integrally formed as shown, preferably from rod stock or tubing, so as to have or be susceptible of acquiring the qualities of resilient yielding strength in the sleeve and constrictable toughness and hardness in the ring part to perform their respective offices and functions within my invention.

A main function of the ring part is to grip and engage the tube T with a strong mechanical grip and preferably also with a fluid tight seal. A main function of the sleeve part is to first offer sufficient axial resistance to movement of the ring part when the latter is engaged by the nut to develop inwardly acting radial components of force between the nut and the ring to induce constriction of the ring and its long helical cutting edge 12, then secondly to yield both radially and axially to permit and induce inward radial and forward axial movement of the cutting edge into the wall of the tube so that the edge may turn up a long helical ridge R of appreciable size, Fig. 3. Withal the sleeve part reacts between the nut and the body and effects a fluid tight seal with the rearward face of the body, and, as the sleeve part is foreshortened and buckled inwardly, cf. Figs. 2 and 3, it preferably forms a fluid tight seal with the adjacent wall of the tube. Conversely and complementarily the offices and functions of the ring part will be seen to include the transmission from the nut to the sleeve of axial components of force to compel the fluid seal between the sleeve and the body and to foreshorten the sleeve and concurrently to transmit radial components of force from the nut to the rearward end of the sleeve to induce its inward yielding and deflection incident to its foreshortening and/or buckling into sealing and gripping engagement with the tube while it is being foreshortened. A further function of the sleeve is, preferably, that it "bottoms" on the tube and with the bottoming of the root of the helical edge 12 on the tube and ridge affords a sharp increase in resistance to movement of the nut and ring as shown in Fig. 3 thereby notifying the operator making the joint that the desired joint has been sufficiently made by reflecting a sharp increase in wrench torque applied to the nut.

Turning now more particularly to Figure 4 and the structure of the coupling element E, the ring portion 10 thereof has an internally threaded bore 23, preferably cut with a continuous single pitch thread 18; the thread 18 having a continuous sharp helical top 12 which comprises the continuous helical cutting edge for the coupling element. The thread 18 is preferably also characterized by a flattish, rounded root 19 smoothly merging with the front face 14 of the thread and the rear face 13 of the thread. My preference is that the rearward face 13 of the thread be inclined at about 15 degrees from the axis of the bore of the ring and that the front face 14 of the thread as it extends radially outwardly from the edge 12 have a slight rearward rake of about 2° for an appreciable radial distance before turning to merge into the rounded root 19 of the thread. With the thread so formed and when the ring 10 is constricted radially and moved forward axially the whole length of the top 12 of the thread 18 engages the exterior surface of the tube like an elongated cutting tool with the rake of the face 14 affording a cutting angle of a little less than 90° and the inclination of the rear face of the thread 13 affording a relief angle of about 15°. The top, i. e. minimum, diameter of the thread as measured at the edge 12 is preferably very little greater than the outside diameter of the tube to permit the threaded bore 23 to be slid over the end of the tube, regard being had for the variations in actual outside diameters of tubes of the same nominal size and reasonable manufacturing tolerances for the top diameter of the thread. Preserving this form of thread will make the root diameter thereof a substantial function of the pitch of the thread which I have found satisfactory at about from between 30 to 50 turns of the thread per inch giving the threads a depth of about from 5/1,000 of an inch to 75/10,000 and a root diameter exceeding the inside diameter by about 10 to 15 thousandths inches.

Preferably the surface 7 of the ring is pitched at substantially the same angle, about 30°, as the surface 6 of the nut N so that when and as forcible advancement of the nut toward the body is induced the ring will be constrained to move bodily axially forwardly and radially inwardly and, withal, substantially coaxially of the nut, body and tube without, however, the marked rolling or tipping action as described in my co-pending application. This form of my invention tolerates reasonable departures from true conicalness of the surfaces 6 and 7 and from complete congruity of those surfaces to each other so long as such departures do not deleteriously modify the operation and results of my invention as revealed in this specification as a whole; it being recognizable, of course, that if the surface 6 of the nut is pitched a few degrees less than the surface 7 of the ring that the ring will tend to be rolled forwardly, following pro tanto the teaching of my co-pending application, decreasing the rake of the surface 14 and increasing the relief angle of the forward part of the bore 13. The converse tends to follow when the surface 6 is pitched a little steeper than the surface 7.

When the nut and body have threaded engagement as shown and the threads are conventionally right handed then my preference is that the thread 18 be left handed so that the tendency of the nut to rotate the element E with respect to the tube will be diverted into a component of force acting approximately normal to the helical edge 12. Should the nut take the form of a flange ring for a flanged body and have only true axial movement toward the body, the right or left handedness of the thread 18 becomes a matter of indifference. As a practical matter I prefer that the engagement between the element E and the rearward face of the body B so substantially resist rotary motion of the element E with respect to the body while the nut N is being turned, and tending to rotate the element E, that the action of the thread 18 on the tube will be very much the same regardless of whether or not the thread 18 is right handed or left handed.

Radially outward of the forward portion of the bore 23 the ring 10 takes its maximum thickness and bodily mass whereby to afford good strength and support for the helical edge 12 as a cutting tool and to back up and support the rearward end of the sleeve 11 and to impose radial pressure upon it and upon the helical ridge R when the same is turned up and confined fluid tight between the convolutions of the thread 18 as shown in Figure 3. The external surface of the ring 10 may, to conserve radial space, be cylindrical as shown for a limited distance forwardly of the inclined surface 7; the surface 7 extending from the rear of the ring forwardly to a plane normal to the axis only a little rearwardly of the forward end of the bore 23 to afford a wide bearing between the nut and the ring at and all around the points from which the radial and axial components of force reaching the helical edge 12 emanate. These considerations, taken with the angles of pitch of the surface 6 and the face 13 of the thread 18 will tend to give the ring an effective axial length not much longer than the thickness of the ring. The mean length of the ring is preferably about equal to or a little less than the full thickness of the ring.

Having regard for the material from which the element E is made the cutting action of the edge 12 may be enhanced with a desirable minimum of resistance to constriction and a minimum tendency to deleterious fracture, by hardening the surface of the thread 18 to a depth of from one to several thousandths of an inch as suggested by shading at 16, best shown in Fig. 4. Such hardening comprehends the geometrical line edge 12 and tends to be deepest adjacent the edge. The matter of choice of materials for the coupling element in relation to the material of the tube to be coupled and the desirable hardness of the edge 12 in relation to the hardness or softness of the tube is discussed more fully below.

The bore 23 and thread 18 terminate at their forward end in a radial face or shoulder 17 which has a radial dimension substantially exceeding the depth of the thread 18, terminating outwardly at the intersection with the bore or counterbore 15 of the sleeve portion 11 of the coupling element E and measuring the radial spacing of the sleeve 11 from the external surface of the tube. I prefer that this radial spacing be substantial, preferably of the order of distance mentioned below, to facilitate flexing or buckling of the sleeve 11 to induce and facilitate the desired motion of the ring 10 with the influence of the nut N.

The sleeve part of the element E in this form of my invention preferably has a radially thickened forward anchoring portion 8 with its forward face having the shallow annular step 4 proportioned to fit into and have centering and sealing engagement with the step 3 of the face 2 of the body. The thickened portion 8 with or without the interfit of the steps 3 and 4 tends to restrain the forward end of the sleeve 11 from radial expansion when the element E is worked between the nut and body. Between the anchoring portion 8 and the ring 10 the sleeve comprises a thin walled tubular, so-called bridge or resistantly yieldable portion 9 which is preferably several times longer than its wall thickness with its bore 15 substantially exceeding the outside diameter of the tube to permit radial inward yielding and/or buckling of the "bridge" and radial inward cutting movement of the edge 12 until ridge R has filled the convolutions of the thread 18 and the ring has bottomed thereupon and made a strong mechanical bond and fluid tight seal therewith. At about the time this bottoming of the ring and thread occurs the rearward end of the bridge preferably bottoms or tends to bottom on or approaches substantial contact with the tube under the forward overhanging end of the ring, see Figure 3.

The material of which the coupling element may be made admits of a considerable choice depending in part upon the material and character of the tube to be coupled as well as the materials that are desired to be employed in the nut and body. My greater preference is to use S. A. E. 1117 steel for the stock of the coupling element because it is freely machinable and admits of case or surface hardening throughout all parts of the element including the bridge as well as the cutting edge or edges, without deleterious impairment of the flexibility and workability of the flexed and worked parts characteristic of the mode of operation of my coupling element. Using S. A. E. 1117 steel I do not necessarily harden the coupling element, other than work hardening by the necessary machining, so long as its cutting edge or edges are harder than the tube and/or body to be cut or bit, see Fig. 6. With steel or stainless steel or other harder tubes the wholly surface hardened S. A. E. 1117 steel coupling element provides satisfactory cutting edges and preserves desirable workability in the other parts of the element. My lesser preference is to use other free machining steels for the coupling element and, when used with tubing and/or tubes and bodies that are harder than the unhardened element, to confine the hardening of the element to limited areas adjacent the cutting edge or edges. Using aluminum body, nut and tube, or steel or brass nuts and bodies with copper tube, for example, the coupling element E may be made of such steel and not hardened so long as it is of greater hardness than the tube to be coupled and, in the form of Figs. 5–7, preferably harder than the body to aid the bite of the edge 20 into or against the body. On steel tubes I may use a steel coupling element of similar hardness but of free machinability, which after being machined and formed is given a light case hardening preferably only on the surface of the thread as in the area 16 as by cyaniding and carbo-nitriding to have a case of as little as one to two thousandths inches deep. Dealing with stainless steel tubing, I find it practicable to harden the cutting edge and area 16 more deeply and to a greater degree of hardness while largely avoiding hardening of the bridge and the rest of the coupling element. Confining the hardening to the limited area of the surface of the thread 18 may be done by copper plating the whole element lightly before cutting or tapping the thread 18 and then cutting or tapping the thread whereby to leave the surface of the thread uncoated and thereby exclusively exposed to the cyaniding or other hardening treatment. Alternatively the coupling element E may be completely formed and machined, thread and all, and then a rubber tube inserted into the bore 23 and inflated to have intimate contact with the forward portions of the surface 13. The whole element except the forward portions of the surface 13 in contact with the inflated tube may then be lightly copper plated and become resistant to cyaniding, but the forward portions of the surface 13 immediately behind the edge 12 will be free of plating and therefore after the tube has been removed and the element exposed to a cyaniding process only that part of the surface 13 which was covered by contact with the inflated tube will be hardened. While I mention my preference for localized hardening, I, of course, do not confine myself in this example of hardening to any other specific use but leave it to the judgment and choice of the user to harden the "edge" or other parts of the element generally or specifically as occasion may require within the broad precepts and teachings of my invention.

To facilitate understanding and practice of my invention an example of size and proportion of the coupling element of my invention is stated by way of further illustration and exemplification, as follows:

For ½" O. D. tube the diameter of the helical edge 12 need exceed ½" only by enough to take care of variations in commercial tolerance of the tube and coupling element to afford a free sliding fit. The O. D. of the anchoring portion 8 and ring 10 is about .680". The portion 8 is about .04" to .06" long and the length of the bridge on the outer surface is about .109" long, and, the sleeve as measured along the bore 15 from the face 17 to the forward end is about .180" long. The radial depth of the surface 17, i. e. the height of the bridge above the edge 12 is about .02" to .03", preferably exceeding the depth of the thread for the reasons mentioned above. The thickness of the bridge is about .0185" to .02" and the depth of the groove above the bridge between the outer part of the ring and the anchor is about .0385". The outer cylindrical surface of the ring is about .02" to .03" long. The overall length of the ring is about .09" to .12" and not much greater than or substantially the same as its thickness. While the drawing in Figure 4 is not necessarily exactly at scale, I have undertaken to make it correspond substantially to the dimensions and proportions here given. For tubes of greater and smaller size my experience has been that all the dimensions above stated should not necessarily be modified proportionately for the best practice of my invention. For example in making a coupling element for a one inch tube the bores and the external diameters of the ring and abutment might well be approximately doubled in respect to the ½" size and the overall length might be moderately increased as in the anchor and ring, but the length and thickness of the bridge and its spacing from the tube may well be kept about the same as in the ½" size although the mean diameter of the bridge would have to be approximately doubled as compared with the ½" size. It will also be appreciated that the length of the bridge, while maintaining its desired relative thickness, and the radial spacing particularly of the rearward end of the bridge from the edge 12 may and preferably should be modified with regard to the size and pitch of the thread 18 to facilitate all the desired motion of the ring 10 to bring about the cutting and tube and ridge gripping action for the best practice of my invention.

My preference that the angles of pitch of the surfaces 6 and 7 be about 30° and the pitch of the face 13 of the thread 18 be about 15° is stated because I have found such angles to be satisfactory in service and on test, both in respect to desirably low wrench torque and efficient cutting, sealing and joining action. Those who understand the whole teaching of this specification will appreciate that flattening the angles of the shoulders 6 and 7 without other change, as down to 25°, will increase the radial component on the ring, edge and sleeve and correspondingly decrease the axial component and increase the travel of the nut in respect to movement of the edge 12. Such may well have advantage with tougher and thicker walled tubes. Conversely with the shoulders 6 and 7 at 35°, a workable and useful angle, opposite tendencies would prevail, inclining to advantage with softer and thinner walled tubes. Decreasing the pitch of the helical face 13 as from 15° to 10°, other things being unchanged, would tend to require more axial travel of the ring and edge for the same depth of cut and would tend to increase the bodily constriction of the tube within the thread 18, a thing having desirable characteristics as for coupling a large diameter relatively soft thin-walled tube intended for use under circumstances where extra anti-vibration qualities are sought in the coupling. Increasing the pitch of the face 13 as from 15° to 20°, other things being equal would tend to have opposite effects and advantages for somewhat dissimilar purposes, such as getting a deep cut more quickly and a less intense grip between the thread and the ridge and the tube.

The practice and operation of this form of my invention comprises that the parts be assembled in the relation and position shown in Figs. 1 and 2; the forward end of the tube and the forward end of the coupling element E abutting the body, the camming shoulder 6 of the nut contacting the shoulder 7 of the ring and the helical edge 12 substantially contacting the external surface of the tube. Thereupon the nut is forcibly advanced toward the body as through the threaded engagement therebetween and, consequently, the ring 10 with its edge 12 is simultaneously tended to be constricted inwardly and advanced axially relative to the tube and the body whilst the bridge 9 yieldingly resists axial movement of the ring sufficiently to compel its radial constriction and radial constriction of the edge 12. As the rearward end of the bridge yields to inward deflection and/or deflection and inward buckling with the constriction of the ring and cutting edge, axial forward movement of the ring and edge also takes place. Cutting engagement between the edge 12 and the tube begins at once the edge is constricted into cutting engagement therewith and may and preferably does continue under the forcible urging of the nut until bottoming occurs between the root of the thread and the helical ridge R as the latter is turned up by the edge 12. At about the same time the rearward end of the bridge 9 may and preferably does buckle into annular contact with the tube and into substantial confining contact with the foremost end of the forward turn of the ridge R, Fig. 3. As suggested in Fig. 3 I prefer that the form of the threads, the ratio and length to thickness of the wall of the bridge, the spacing between the bridge and the tube, and the angles of the shoulders 6 and 7 coact to bring the inward buckled part of the bridge into fluid tight contact with the wall of the tube about simultaneously with the fluid tight filling of the convolutions of the thread 18 with the helical ridge R, but even if neither complete nor forcible contact between the buckled end of the bridge and the tube is effected before the ridge is sealed in the thread the operation and results of my invention will not be deleteriously impaired. Nor will complete and forcible contact between the buckled end of the bridge and the tube prior to complete filling the root convolution of the thread by the ridge deleteriously impair the operation and results of my invention since such initial buckled contact will not forbid further constricting and axial cutting movement of the ring and edge, with perhaps increased wrench torque, until the ridge fills the root with an increased buckling and contact between the bridge and the tube, or alternatively if the cut and less than maximum ridge are sufficient for the desired mechanical grip without establishing a fluid seal between the ridge and the thread the buckled bridge may be relied upon for a substantial fluid seal per se. A direct incident of the buckling, cutting and gripping action is that the forward end of the element E is forced into fluid tight sealing relation with the rear face 2 of the body. Withal the whole length of the bore of the ring and the thread 18 acquires a strong "full threaded" grip on a relatively long length of the wall of the tube with a new and much extended length of cut and ridge several times as long as the circumference of the tube and cutting and gripping the tube over a wide area with relatively small constriction of the fluid passage through the tube in relation to the strength of the grip exerted on the tube, holding the tube firmly against axial movement toward or from the body and with enduring resistance to failure from internal pressure, impulse or vibration.

The angle of taper of the face 13 of the thread 18 not only provides the relief and clearance to facilitate the action of the cutting edge described above but also substantially measures the radial squeeze and forcible engagement between the portion of the face 13 which contacts the surface of the tube rearwardly of the cutting edge. When the thread face 13 has a 15° taper, for which I have indicated a preference above, the surface of the face immediately behind the cutting edge in its bearing upon the freshly cut surface of the tube tends to constrain the cutting edge to have a forward and inward motion in the surface or a cone pitched at 15° from the axis of the coupling. This path of motion of the cutting edge is, however, influenced not only by the pitch of the face 13 but also by (1) the resistance of the tube wall to diametrical constriction, (2) the resistance of the tube wall to the cutting action of the edge 12, (3) the relative resistance of the bridge of the sleeve to axial foreshortening in relation to its resistance to radial inward deflection or bending, (4) the resistance of the ring 10 to radial constriction, and (5) the pitch of the surfaces 6 and 7 and therefore the direction of the resultant force imposed by the nut onto the ring. For example, if the bridge 9 is more highly resistant to axial foreshortening, as compared with the strength of the tube in resistance to diametrical constriction plus the resistance of the ring to diametrical constriction than I prefer, then the ring and edge 12 will tend to have relatively great radial inward movement compared with little axial movement and the face 13 will tend to have a wide constricting grip upon the correspondingly constricted but slightly cut wall of the tube. Toward the other extreme and by way of opposite example, were the bridge 9 more weak than I prefer in resistance to axial foreshortening in respect to a strong, tough tube highly resistant to cutting and with the ring having relatively high resistance to constriction, then the edge would tend to have much or too much axial motion with too little cutting or possibly so little cutting that the face 13 might not engage the wall of the tube except at or closely adjacent the line of the edge 12. In the more desirable and more advantageous operation of my invention with the parts formed and proportioned with better regard to the service intended to be rendered by them as suggested above, the ideal resistance offered by the bridge 9 to axial motion of the edge 12, in this preferred form of my invention, will be somewhat greater than that which would induce the edge 12 to move forwardly and inwardly in the true surface of a 15° cone, such for example as tending to move the edge forwardly and inwardly in the surface of a 20° or 25° cone, and therefore the forward portion of the face 13 will correspondingly tend to bear upon the external cut surface of the tube and resist the extra radial component of force which tends to deepen the cut and have tube gripping component and vibration dampening grip upon the wall of the tube of measurable force and value. As suggested in Figure 3, I prefer that approximately the forward half of the face 13, as a result of the considerations mentioned above, will have a firm, snug grip upon the freshly cut external wall of the tube behind the cut when the joint is completed, and that approximately the rearward half of the face 13 and curved root 19 of the thread be tightly filled with the ridge R turned up from edge and face 14 of the following convolution and squeezed and confined therewith and thereby.

Figure 5:
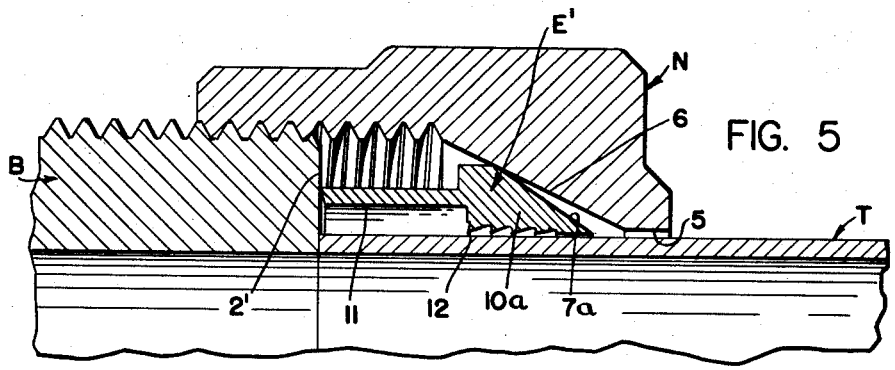
Figure 5 is a fragmentary longitudinal section similar to Figure 2 showing a modified form of my invention with the parts in assembled relation prior however to the final coupling and joining thereof.
Figure 6:
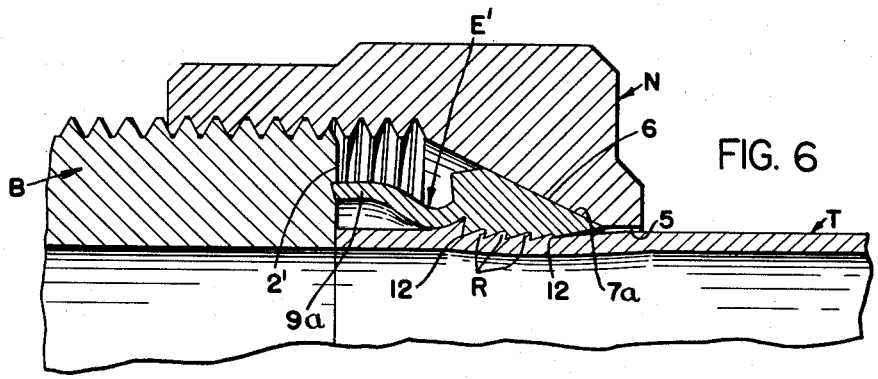
Figure 6 is a similar view with the parts in coupled and joined relation.
Figure 7:
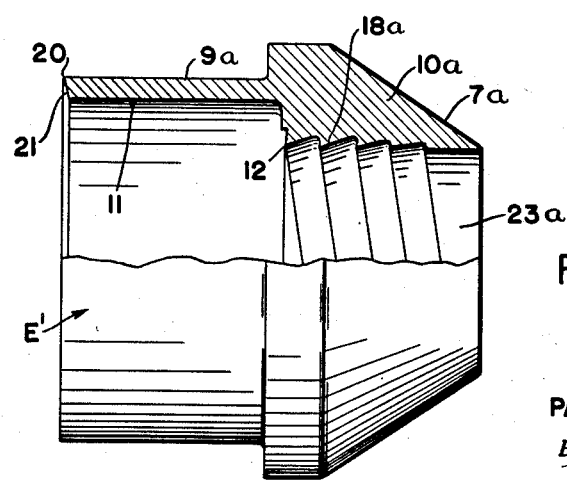
Figure 7 is an elevation partly in longitudinal section of the coupling element of Figures 5 and 6.

A modified form of my invention is shown in Figures 5, 6 and 7 in which parts identical with those described in connection with the preferred form of my invention are referred to by the same reference characters or numbers. This form of my invention differs from the preferred form in certain features of the coupling element E' which may be taken as substantially corresponding to the coupling element E above described except that in the coupling element E' the ring 10a has its bore 23a specifically different from the bore 23 of the ring 10, and in the coupling element E' the sleeve and bridge part 9a are co-extensive and terminate at the forward end of the coupling element in a bevelled face 21 which is preferably hardened and terminates outwardly in a cutting edge 20 adapted to cut into the rearward flush face 2' of the body B and make its own seat, Figs. 5 and 6. The forward portion of the bore 23a of the ring 10a may correspond entirely to the forward portion of the bore 23 of the coupling element E, and have the thread 18a equal to the thread 18 cut or tapped therein, but in this form of my invention the rearward part of the bore 23a is left smooth and cylindrical and of diameter corresponding to the minimum diameter of the thread 18a measured on the edge 12 thereof. The thread 18a may extend about half the length of the bore 23a and run out in about the mid-length of the bore, preferably having two or three turns of full depth and form and having one or two turns of less than full depth in the middle of the bore. The ring 10a may otherwise correspond to the ring 10 except that the outer and rearward camming shoulder 7a is pitched a little more steeply than the juxtaposed shoulder 6 of the nut N so that the action of the ring includes a forward rolling movement, tipping the ring forwardly while constricting it inwardly, much as taught in my co-pending application, cf. Figs. 5 and 6; the nut first contacting the outer annular corner of the shoulder 7a, Fig. 5, and tipping the ring to induce cutting contact and action of the edge 12 of the thread 18a with the tube without impairment of this action from contact between the smooth rearward portion of the bore 23a. Depending to a considerable extent upon the depth of the thread 18a the difference in inclination between the shoulders 6 and 7a is desirably such that the forward rolling and tipping of the ring will be limited to an extent which will bring the rearward end of the bore into forcible fluid tight, tube constricting engagement with the tube at substantially the same time that the edge 12 has turned up the helical ridge R and filled the forward convolutions of the thread 18a. With the thread 18a formed like the thread 18 described above the shoulder 7a may be conically formed and pitched about 5° steeper than the shoulder 6; for example, the shoulder 7a having a 35° pitch when the shoulder 6, similarly formed is pitched at 30°.

The sleeve and bridge element 9a may substantially correspond to the bridge element 9 above described except that in this form of my invention I prefer that it be of substantial uniform wall thickness throughout terminating at its forward end in the hardened cutting edge mentioned above.

In the operation and practice of this form of my invention the parts will perform substantially the same offices and functions as those above described except that the edge 20 at the forward end of the sleeve will under the influence of pressure from the nut cut its own seat and the flush face 2' of the body B and effect a fluid tight seal therewith and gain resistance to radial expansion and rotation by its biting and cutting engagement with the rearward face and the body. Under the same influence of force and motion from the nut the ring 10a will move and roll axially forwardly and radially inwardly carrying its cutting edge 12 into cutting engagement with the exterior surface of the tube T while these motions are facilitated by the resistant yielding of the sleeve and bridge 9a as above described.

In this form of my invention, however, when and as the parts approach the state shown in Figure 6 the rearward cylindrical portion of the bore 23a of the ring 10a will come into contact with a corresponding length of the external surface of the tube T and as the tube is more firmly and snugly engaged by the thread and this cylindrical portion of the bore further constriction and cutting action of the ring 10a will tend to be halted. This is a "bottoming" effect reflected in a sharp increase in wrench torque and signalling the completion of the joint and also gives a firm, snug, vibration dampening and fluid sealing grip between the rearward portion of the ring 10a and the tube. Inter alia this smooth grip between the rearward part of the bore of the ring and the tube guarantees a tight fluid seal between the ring and the tube regardless of the entire filling of the convolution of the thread 18a by the helical ridge R.

As suggested in Figure 6 the "bottoming" that is effected by engagement between threaded and/or the cylindrical portion of the bore of the ring 10a and the tube is preferably substantially simultaneous with the "bottoming" of the rearward end of the sleeve or bridge 9a upon the tube and the adjacent end of the helical ridge R. Contact between the rearward end of the sleeve 9a and the tube tends to be accelerated by the rolling and tipping of the ring and may precede ultimate "bottoming" of the ring with the effect that a buckling of the sleeve will be relatively increased before the ring bottoms and the tube will be gripped with beneficient fluid sealing and vibration dampening effect in front of as well as behind the thread 18a.

While I have illustrated and described a preferred and modified form of my invention, changes, other modifications and improvements will occur to those skilled in the art who come to understand its uses and advantages, and therefore I do not care to be limited to the specific forms or illustrations of my invention herein specifically disclosed nor in any manner inconsistent with the promotion of progress in this art marked by my invention.

I claim:

1. A tube coupling, comprising in combination a body with a rearward end in relation to which the tube bears immovably and is coupled, radially thick and axially short and axially substantially inflexible ring means having an internally threaded bore encircling the tube, the thread having a blunt root form and an inwardly and forwardly disposed helical substantially radial face and a helical tapered rearward face inclined at an angle to the axis of the bore and forming a helical edge of a plurality of uninterrupted turns and harder than the tube and with a cutting angle not substantially exceeding a right angle and with a relief angle corresponding to said tapered face to facilitate forward tube cutting action of said edge, said edge being spaced axially from said body and adapted to be forcibly constricted into cutting engagement with the tube and advanced axially forwardly toward said body and relative to the tube and cut a helical groove in and turn up a helical ridge of appreciable size from the exterior of the tube tending to fill the root of the thread, and said ring means having an outwardly and rearwardly disposed inclined bearing surface with a foremost portion located radially remote from and axially near a forward part of said cutting edge and inclined oppositely of said tapered face of said thread and more steeply than said relief angle, means for controlling the motion of said cutting edge and being disposed between said body and said ring means and encircling the tube and yieldably resisting motion of said edge toward said body and having a forward end substantially axially immovably engageable with said body and a rearward end integrally joining said ring means with radial clearance from said cutting edge, and said last named means having an axially flexible portion proportioned axially long and radially thin compared with said ring means and having resistance to axial compression in the absence of radial deflection and having diminished resistance and yielding to axial compression after radial deflection, and means having a camming shoulder pitched less steeply than and coacting with said inclined bearing surface for imposing axially forward and radially inward forces on said ring means to constrict said edge and deflect and foreshorten said portion and advance said edge forwardly relative to the tube whereby to cut a helical groove of appreciable axial length and radial depth in said tube and turn up a helical ridge of appreciable size tending to fill the root of the thread and form a fluid-tight seal within the thread against fluid flow in the helical direction of the thread.

2. The combination in a tube coupling of a body to the rearward end of which the forward end of a tube is coupled in axially compressed engagement against said body; the tube having a helical groove and an adjoining helical ridge cut from the groove and rising radially outwardly thereof of a plurality of continuous unbroken turns with a tapered rearward surface common to the ridge and groove and an abrupt forward face common to the groove and ridge, a coupling member having a bore for the tube and forcibly coacting with said body, and a deformed coupling element forcibly gripped between said member and body and gripping the tube and having a fluid tight engagement with the tube and with said body, said member having a forwardly and outwardly inclined camming shoulder engaging the rearward end of said element, the rearward end of said element comprising a thick substantially axially inflexible ring-like part having an outward and rearward inclined surface engaged by and constricted by said member and having an internal helical thread of more than a complete uninterrupted turn corresponding to said groove and ridge with a root having a fluid tight contact with said ridge and with a rearward tapered face forcibly engaging said rearward tapered surface of said groove and ridge and stressing the same and said tube in radial compression within said thread and with a substantially radial forward face defining an edge at the forward end of said tapered surface of the thread and forcibly engaging the forward face of said groove and ridge and stressing said tube in axial compression toward said body, said edge being embedded in said groove in the tube behind said ridge and radially inward and substantially under said camming shoulder, said element also comprising a forward end part forcibly engaging said body and a flexible thin walled tubular part integrally formed with said ring-like part and extending forwardly therefrom from above said thread and having an annular portion forcibly buckled inwardly upon the tube forwardly of said groove and rearwardly of said body.

References Cited in the file of this patent

UNITED STATES PATENTS

| Number | Name | Date |
|---|---|---|
| 2,233,214 | Lamont | Feb. 25, 1941 |
| 2,452,278 | Woodling | Oct. 26, 1948 |
| 2,453,024 | Lomelino | Nov. 2, 1948 |
| 2,522,785 | Hanson | Sept. 19, 1950 |
| 2,585,453 | Gallagher et al. | Feb. 12, 1952 |
| 2,641,487 | La Marre | June 9, 1953 |